United States Patent [19]

Itoh et al.

[11] Patent Number: 4,849,311

[45] Date of Patent: Jul. 18, 1989

[54] IMMOBILIZED ELECTROLYTE MEMBRANE

[75] Inventors: Takuji Itoh, Sayama; Kazuo Saeki, Saitama; Koichi Kono, Asaka, all of Japan

[73] Assignee: Toa Nenryo Kogyo Kabushiki Kaisha, Tokyo, Japan

[21] Appl. No.: 247,744

[22] Filed: Sep. 22, 1988

[30] Foreign Application Priority Data

Sep. 24, 1986 [JP] Japan ................. 62-237516

[51] Int. Cl.$^4$ ............................................. H01M 6/18
[52] U.S. Cl. ................................................. 429/192
[58] Field of Search ............... 429/192, 191; 204/296, 204/421; 252/62.2

[56] References Cited

U.S. PATENT DOCUMENTS 4,654,279  3/1987  Bauer et al. ................. 429/192
4,681,822  7/1987  Berthier et al. ............ 429/192 X
4,722,877  2/1988  Sammells ..................... 429/192
4,737,422  4/1988  Knight et al. ................ 429/192

FOREIGN PATENT DOCUMENTS 55-94604  7/1980  Japan .
61-93805  5/1986  Japan .
63-40270  2/1988  Japan .

Primary Examiner—Anthony Skapars
Attorney, Agent, or Firm—Michael N. Meller

[57] ABSTRACT

Disclosed are immobilized electrolyte membranes having a high electric conductivity and a high mechanical strength, where an ionic conductor such as a polymer electrolyte or an ion-exchange resin is immobilized in pores of a porous solid polymer membrane, particularly of polyolefin having a weight average molecular weight of not less than $5 \times 10^5$, the porous solid polymer membrane having a thickness of 0.1 μm to 50 μm, a porosity of 40% to 90%, a tensile strength of not less than 200 kg/cm$^2$, and an average permeable pore diameter of 0.001 μm to 0.1 μm.

19 Claims, No Drawings ized electrolyte membrane. This immobilized electrolyte membrane can be widely used in, for example, a fuel cell, an electrolytic cell of water, an electrolytic cell of brine, a primary battery, a secondary battery, a membrane for separation of facilitated transport, an electrochromic device, or a sensor, where a low electric resistance and a high mechanical strength of the membrane are required.

IMMOBILIZED ELECTROLYTE MEMBRANE

BACKGROUND OF THE INVENTION

1. Field of the Invention

The present invention relates to an immobilized electrolyte membrane. This immobilized electrolyte membrane can be widely used in, for example, a fuel cell, an electrolytic cell of water, an electrolytic cell of brine, a primary battery, a secondary battery, a membrane for separation of facilitated transport, an electrochromic device, or a sensor, where a low electric resistance and a high mechanical strength of the membrane are required.

2. Description of the Related Art

As a solid polymer electrolyte (SPE), there are known an ion-exchange membrane, typically a membrane of perfluorocarbon-system having a sulfonic group (Nafion ®), an ionic conducting membrane, typically a complex of polyethylene oxide (PEO) and an alkali metal salt such as $LiCF_3SO_3$, $LiClO_4$ and $LiAsF_6$, and others. Ion-exchange membranes of perfluorosulfonic acid, perfluorocarbonic acid, etc., have excellent chemical and thermal resistances and enable the construction of a compact cell with an anode and a cathode, and therefore have been used in brine electrolysis and are experimentally used in a fuel cell and water electrolysis, and the like. In this connection, a polystyrene sulfonic acid type ionic exchange membrane was used in a hydrogen-oxygen fuel cell for space development objectives, but was improved as used for brine electrolysis. More effective perfluorocarbon type ion-exchange membranes have been developed, and most electrolysis processes of chlorine and alkali salts now have been converted to ion-exchange membrane processes. In a system using an SPE problem arises of a reduced electrical energy efficiency due to ohmic loss by an electric resistance of a membrane of the SPE. An SPE membrane using an ionic conductor such as a composite of PEO and an alkali metal salt has an advantage in that it is substantially a solid, but is two to three orders of magnitude lower in the specific electric conductivity than that of an aqueous solution system of a mineral acid, alkali or salt, which limits the use thereof due to the ohmic loss. For example such a polymer electrolyte having a thickness of 50 $\mu$m and a specific electric conductivity of $10^{-6}$ S·cm$^{-1}$, has an effective electric resistance of 5000 $\Omega$cm$^2$. Reducing the thickness of a membrane may be a solution to the reduction of the electric resistance, but is limited by mechanical strength considerations, and such a membrane of an ionic conductor as having a practical mechanical strength at a thickness of, e.g., not more than 25 $\mu$m, is not known. An ion-exchange membrane of perfluorosulfonic acid or perfluorocarbonic acid has an effective electric resistance of 1 $\Omega$·cm$^2$ to 100 $\Omega$·cm$^2$ or more, and the thickness of this type of membrane is also limited by consideration of the mechanical strength thereof. A membrane of Nafion ®, for example, has a thickness of 0.11 mm to 0.25 mm, and a membrane of an ion-exchange resin having a practical mechanical strength at a thickness of not more than 100 $\mu$m is not known. Moreover, a fluorine-type ion exchange resin membrane, typically of Nafion ®, is expensive.

SUMMARY OF THE INVENTION

The inventors carried out an investigation into a solid electrolyte membrane having both a high electric conductivity and a satisfactory mechanical strength, and which practically effectively reduces the production and running costs of a cell or device using the membrane and found that the above object can be realized by preparing a porous solid polymer membrane having a thickness of 0.1 $\mu$m to 50 $\mu$m, a porosity of 40% to 90%, a tensile strength of not less than 200 kg/cm$^2$, and an average diameter of permeable pores of 0.001 $\mu$m to 0.1 $\mu$m and immobilizing an ionic conductor such as a polymer electrolyte or an ion-exchange resin in the porous solid polymer membrane.

According to the present invention, there is provided an immobilized electrolyte membrane comprising an electrolyte immobilized in pores of a porous solid polymer membrane, the porous solid polymer membrane having a thickness of 0.1 $\mu$m to 50 $\mu$m, a porosity of 40% to 90%, a tensile strength of not less than 200 kg/cm$^2$, and an average diameter of permeable pores of 0.001 $\mu$m to 0.1 $\mu$m.

The electrolyte immobilized in the porous solid polymer membrane includes an ionic conductor, particularly a liquid ionic conductor such as a polymer electrolyte, and an ion-exchange resin.

The porous solid polymer membrane may be made of polyolefin, polytetrafluoroethylene and polyfluorovinylidene, but preferably is made of a polyolefin having a weight average molecular weight of not less than $5 \times 10^5$.

DETAILED DESCRIPTION OF THE INVENTION

The porous solid polymer membrane used in the present invention is designed to contain an electrolyte in the pores thereof, and thus act as an electrolyte substantially in the form of a solid and maintain a stable function. The thickness of the porous solid polymer membrane is from 0.1 $\mu$m to 50 $\mu$m, preferably 0.1 $\mu$m to 25 $\mu$m. At a thickness of less than 0.1 $\mu$m, the mechanical strength of the membrane is lowered to an extent such that it cannot be used as a supporting membrane and the handling thereof is worsened, and thus it is difficult to use in practice. A thickness of more than 50 $\mu$m is not preferable, as this will lower the effective electric resistance. The porosity of the porous solid polymer membrane should be from 40% to 90%, preferably 60% to 90%. A porous membrane with a porosity of less than 40% does not give a sufficient electric conductivity as an electrolyte and a porous membrane with a porosity of more than 90% has a low mechanical strength such that it cannot be used as a supporting membrane in practice. The average diameter of permeable pores of the porous membrane, which is measured by a particle permeation method, is from 0.001 $\mu$m to 0.1 $\mu$m, preferably 0.005 $\mu$m to 0.05 $\mu$m. The maximum pore diameter measured by the particle permeation method is preferably not more than 200%, more preferably not more than 130% of the average permeable pore diameter. At an average permeable pore diameter of less than 0.001 $\mu$m, it is difficult to fill an electrolyte in the pores due to geometrical restriction, and at an average permeable pore size of more than 0.1 $\mu$m, it is difficult to fill an electrolyte into the pores by capillary condensation and to prevent leakage of the electrolyte from the porous membrane. The porous solid polymer membrane preferably has a tensile strength of not less than 200 kg/cm$^2$, more preferably not less than 500 kg/cm$^2$, so that it can be used as a supporting membrane in practice.

The porous solid polymer membrane used in the present invention is used as a carrier for an electrolyte, as mentioned above, and is made of a polymeric material having an excellent mechanical strength. From the viewpoint of chemical stability, for example, polyolefin, polytetrafluoroethylene and polyfluorovinylidene may be used, but a polyolefin having a weight average molecular weight of not less than $5 \times 10^5$ is most preferable from the viewpoint of design ease, porosity of the structure, and a combined thin thickness and mechanical strength. The polyolefin preferably used is a crystalline linear polyolefin of monopolymer or copolymer having a weight average molecular weight of not less than $5 \times 10^5$, preferably $1 \times 10^6$ to $1 \times 10^7$. As examples, polyethylene, polypropylene, ethylenepropylene copolymer, polybutene-1, poly-4-methylpentene-1 and the like can be mentioned, and among these, polyethylene or polypropylene having an weight average molecular weight of not less than $5 \times 10^5$ is preferable. The weight average molecular weight of polyolefin has an effect on the mechanical strength of the resultant porous membrane. Namely, an ultra-high molecular weight polyolefin enables the production of an extremely thin, high strength membrane by stretching, giving a carries for electrolytes having a low effective electric resistance. A polyolefin having a weight average molecular weight of less than $5 \times 10^5$ can not form an extremely thin, high strength membrane by stretching.

The porous solid polymer membrane as described above can be produced by the following process. A homogeneous solution is formed by heat dissolving an ultra-high molecular weight polyolefin in an amount of 1% to 15% by weight in a solvent such as liquid paraffin. The solution is formed into a sheet which is then rapidly cooled to a gel-like state. The gel-like sheet is extraction-treated by a volatile solvent such as methylene chloride, so that the amount of the solvent content in the gel-like sheet is from 10% to 90% by weight. The gel-like sheet is heated to a temperature lower than the melting point of the polyolefin and stretched by more than 10 times the area magnification thereof. The stretched membrane is treated with a volatile solvent such as methylene chloride, to extract and remove the solvent in the stretched membrane, followed by drying.

The average diameter of permeable pores of the thus obtained porous polymer membrane can be measured by mercury porosimetery, electron microscopy, a particle permeation methed, and a gas adsorption method, etc., although the particle permeation method is most suitable from the viewpoint of promoting mass transfer of ions, to which the present invention is related, and therefore is used in the following description. In this method, a permeation test is conducted of a porous membrane with an aqueous dispersion of a polystylene latex particle having a previously known uniform particle size, under a pressure of 1 kg/cm$^2$, and leakage of the particles to a filtrate is determined whereby a permeable pore diameter is obtained. The test of the filtrate is conducted by filtering the filtrate again with a check filter capable of catching the particle and observing the surface of the check filter with a scanning electron microscope to determine the leakage of the particles.

The pore diameter of the fine permeable pores, (less than 0.5 μm) such that the polystylene latex particle cannot permeate therethrough, is determined by conducting a membrane permeation test with a 0.3 wt% aqueous solution of water-soluble linear polymer such as dextran or polyethylene glycol having a known molecular weight, and calculating the pore diameter from the molecular weight of the polymer giving a 50% permeation. The linear polymer in the state of a solution may be considered to be in the state of a spherical thread ball and a relationship $(d/2)^2 = <\rho 2>$ exists wherein d is a diameter of the spherical thread ball and $<\tau 2>$ is a mean square end-to-end length of a molecular chain. According to Flory's theory relating to the viscosity of a polymer solution and a range of molecule of the polymer, the equation:

$$[\eta]M = 2.1 \times 10^{21} <\tau 2>^{3/2}$$

with stand regardless of the king of polymer, and therefore, the diameter d can be calculated from a measured value of the intrinsic viscosity $[\eta]$ and a nominal molecular weight M.

Maximum pore diameter of a porous membrane was obtained from the minimum diameter of polystylene latex particles at zero percent permeation or calculated from the minimum molecular weight of water-soluble linear polymer and as dextran or polyethylene glycol at zero percent permeation.

The electrolyte used in the present invention includes an ionic conductor such as a polymer electrolyte and an ion-exchange resin.

The ionic conductor used may be a complex of an alkali metal or alkali earth metal salt or a protonic acid with a polar polymer such as polyether, polyester and polyimine, or a complex of an alkali metal or alkali earth metal salt or a protonic acid with a network or cross-linking polymer containing the above polar polymer as a segment. Namely, polyethers such as polyethylene glycol, polyethylene glycol monoether, polyethylene glycol diether, polypropylene glycol, polypropylene glycol monoether, and polypropylene glycol diether, or a copolymer of these polyethers such as poly(oxyethylene.oxypropylene)glycol, poly(oxyethylene.oxypropylene)glycol monoether, poly(oxyethylene.oxypropylene)glycol diether, condensation products of ethylenediamine with such polyoxyalkylenes, phosphoric acid ester and aliphatic or arylic esters of polyoxyalylenes can be used. Polyether, for example, polyethylene glycol, polypropylene glycol, or copolymer thereof, is commercially available in the form of liquid and powder having different molecular weights and polymerization degrees and thus is convenient for use. Furthermore, a copolymer of polyethylene glycol with dialkyl siloxane (for example, Naruse et al., Polymer Preprints, Japan Vol. 34, No. 7, 2021–2024 (1985); and Japanese Unexamined Patent Publication No. 60-217263), a copolymer of polyethylene glycol with anhydrous maleic acid (for example, C.C. Lee et al., Polymer, 1982, Vol 23, May, 681–689), and a copolymer of monoethyl ether of polyethylene glycol with methacrylic acid (for example, N, Kobayashi et al., J. Physical Chemistry, Vol 89, No. 6, 987–991, (1985)) are known to form a complex with an alkali metal or alkali earth metal ion and have an ionic conductivity of $10^{-5}$ to $10^{-4}$ S·cm$^{-1}$ at room temperature, and hence can be used as a material for composing the immobilized electrolyte membrane of the present invention.

The complex-forming reagents used may be an alkali metal salt, an alkali earth metal salt or a protonic acid. The anions for both the alkali metal or alkali earth metal salt and the protonic acid may be halogen ion, perchloric ion, thiocyanate ion, trifluoromethane sulfonic ion, borofluoric ion, etc. As examples, there can be mentioned lithium fluoride (LiF), sodium iodide (NaI), lithium iodide (LiI), lithium perchlorate (LiClO$_4$), sodium thiocyanate (NaSCN), lithium trifluoromethane sulfonate (LiCF$_3$SO$_3$), lithium borofluoride (LiBF$_4$), lithium hexafluorophosphate (LiPF$_6$), phosphoric acid (h$_3$PO$_3$), sulfuric acid (H$_2$SO$_4$), trifluoromethane sulfonic acid (HCF$_3$SO$_3$), tetrafluoroethylene sulfonic acid (C$_2$F$_4$(SO$_3$H)$_2$), hexafluorobutane sulfonic acid (C$_4$F$_6$(SO$_3$H)4).

The ion-exchange resin may be hydrocarbon-and fluorocarbon-types having a cation- or anion-exchange ability. The hydrocarbon-type ion-exchange resin may be phenol, sulfonic acid; or may be a condensate of phenol and formalin, polystyrene or stylene-divinyl benzene, stylene-butadiene, or stylene-divinylbenzene-polyvinyl chloride, which is provided with a cation-exchange ability by sulfonation or provided with an anionexchange ability by chloromethylation followed by quaternary ammination reaction. The fluorine-type resin may be a hydrate of a copolymer of tetrafluoroethylene with perfluorosulfonylethoxyvinylether, or a copolymer of tetrafluoroethylene with perfluorovinylether having a hydroxyl group in a side chain. When an immobilized electrolyte membrane of the present invention is used for ion-exchange membrane electrodianalysis for a concentration or desalination of brine, a styrenedivinylbenzene copolymer having a sulfonic or quaternary ammonium group is preferably used. Where oxidation resistance in a cathode atmosphere is required, for example, in a fuel cell or for a water hydrolysis, fluorocarbon-type ion-exchange resins having sulfonic, carboxylic and/or phosphoric groups are preferable. The fluorine type ion-exchange resins have an excellent resistance to oxidation by halogen and to strong acids and alkalis, and thus are preferable for composing an immobilized electrolyte membrane of the present invention. As a cation-exchange resin having a sulfonic group, Nafion ® sold by DuPont is also preferable, as this is made by hydrolizing a copolymer of polytetrafluoroethylene with perfluorosulfonylethoxyvinylether and converting its sulfonyl radical to sulfonic radical to give it an ion-exchange ability. To immobilize in the pores of a porous membrane of an ultra-high molecular weight polyolefin of the present invention by impregnating, coating or sparying, the ion-exchange resin material is preferably a solution. A liquid Nafion ® may be obtained, for example, by heat treating a solid Nafion ® in an equivalent weight solution of propyl alcohol, water, etc., in a closed system to 250° C. A commercially available product, which is produced by dissolving Nafion ® having 1100 g of polymer per one equivalent weight of sulfonic acid in an alcohol solution, may be also used.

The method for producing an immobilized electrolyte membrane of the present invention may comprises, for example, (1) impregnating, coating or spraying an electrolyte such as a polymer electrolyte or an ion-exchange resin in a liquid state dissolved in a solvent or dispersed in a solvent as a sol or gel to a porous solid polymer membrane, followed by removing the solvent therefrom if necessary; (2) mixing a solution or a sol-or gel-like dispersion of an electrolyte with a material for producing a porous polymer membrane, followed by forming a membrane; or (3) impregnating coating or spraying a monomer or a soluble precursor of an electrolyte in a porous solid polymer membrane, followed by causing a reaction in the pores.

The impregnation, coating or spraying is used to utilize the characteristics that the porous solid polymer membrane of the present invention has an average size of permeable pores of 0.001 μm to 0.1 μm and takes a liquid having a contact angle of not more than 90° into the pores by capillary condensation. Therefore, the procedures may be widely applied to a liquid system having a contact angle to the solid polymer of not more than 90°; preferably not more than 70°, without any surface modification. A force for condensing and keeping an electrolyte solution in a capillary may be approximated by the formula:

$$\Delta P = \frac{2\gamma \cos\theta}{R}$$

where $\tau$ stands for a surface tension of an electrolyte solution, $\theta$ stands for a contact angle of the solution to the solid polymer, and R stands for a radium of a pore which is supposed to be a capillary in the form of a cylinder. Therefore, to immobilize an electrolyte in the pores, the contact angle of the electrolyte solution to the solid polymer must not be more than 90°, and the pore size of the porous membrane must be as small as stated in the present invention. For example, a reduction of the pore size from 1 μm to 0.01 μm causes an increase of ΔP by two orders of magnitudes. The surface tension of an organic compound used as a solvent is relatively small in comparison with that of water or an alkali metal salt, for example, that of acetonitrile is 20 dyne/cm, that of methylene chloride is 28 dyne/cm, that of benzene is 29 dyne/cm, and that of ethylene glycol, diethylene glycol, and triethylene glycol is 44 to 46 dyne/cm, in air at 20° C. Although an addition of an alkali metal salt generally tends to increase the surface tension, the effect of increasing the above-mentioned ΔP is relatively small. Control of the contact angle is also important when immobilizing an electrolyte solution into pores of an porous membrane through capillary condensation by impregnation, coating or spraying.

The contact angle can be made not more than 90° by appropriate selection of a solvent and surface treatment of a porous polymer membrane. For example, the contact angles of organic solvents to polyolefin are: benzene-less than 5, methylene iodide-52°, formamide-77°, and glycerin-79°. As examples of the surface treatment of a porous polymer membrane, there can be mentioned procedures wherein a porous membrane of polyolefin is immersed in alcohol or acrylic acid, and plasma-treated or graft-polymerized with a monomer of a hydrophilic organic hydrocarbon (Japanese Unexamined Patent Publication No. 61-106640), which may be used for controlling the wetability of the polymer membrane according to the solvent used.

Among the methods for producing an immobilized electrolyte membrane, particularly impregnation, coating or spraying are simple and preferable from the viewpoint of forming a uniform membrane. For example, the following procedure may be utilized when the porous solid polymer membrane is made of polyethylene having a weight average molecular weight of not more than $5 \times 10^5$ and the electrolyte is an ionic conductor of a complex of an alkali metal salt with polyethylene glycol or an ion-exchange resinof Nafion ®.

A uniform solution is prepared by heat dissolving polyolefin having a weight average molecular weight of not less than $5 \times 10^5$ in a solvent. The solvent is capable of sufficiently dissolving the polyolefin and, for example, is a saturated aliphatic hydrocarbon, a cyclic hydrocarbon, an aromatic hydrocarbon or a mixture thereof. Preferable examples are aliphatic or cyclic hydrocarbons such as paraffin oil, decane, undecane, dodecane and tetralin, or petroleum distillates having a melting point corresponding to that of the former. The heat dissolution is conducted at a temperature higher than a temperature at which the polyolefin is gelled in the solvent, and enables the polyolefin to be completely dissolved in the solvent. The dissolving temperature depends on the kind of polyolefin and the solvent used, but is generally from 140° C. to 250° C. The concentration of polyolefin in a solvent is from 1% to 15% by weight, preferably 2% to 8% by weight.

The polyolefin solution is extruded from an appropriately selected die to form a sheet, or cast on a carrier, and cooled at a speed of at least 50° C./min to a temperature lower than a gelation temperature, preferably 50° C. to 60° C., by a water bath, an air bath or a solvent, to form a gel sheet. The gel-like sheet usually has a thickness of 0.1 mm to 10 mm. The gel-like sheet is swollen with a solvent used for dissolving polyolefin, and preferably, then treated to remove the solvent.

The method for removing the solvent from the gel sheet may be that of evaporation of the solvent by heating the gel sheet, removal by compression extraction of the solvent by a volatile solvent, or removal of the solvent while keeping the network structure by freeze-drying. The extraction removal with a volatile solvent is preferable when removing a solvent without a remarkable change of the structure of the gel-like sheet. This volatile solvent may be, for example, hydrocarbons such as benzene, hexane, heptane, and toluene, chlorinated hydrocarbons such as methylene chloride and tetrachlorocarbon, fluorinated hydrocarbons such as trichlorotrifluoroethane, ethers such as diethylether and dioxane, and alcohols such as methanol and ethanol. The stretching is carried out by heating the gel-like sheet and biaxially stretching same by a usual tentering, rolling, or milling, or a combination thereof, to a required magnitude. The biaxially stretching may be conducted simultaneously or successively.

The heating temperature for stretching is preferably in a range of from a temperature of crystal dispersion of polyolefin to a temperature of the melting point of the crystal plus 20° C. More specifically, a preferable range for polyethylene is from 90° C. to 160° C., more preferably from 100° C. to 140° C. At a temperature lower than the crystal dispersion temperature, the softening or plasticizing of the resin is insufficient, and therefore, the membrane is easily broken by stretching and a high magnitude stretching becomes difficult. At a temperature, far higher than the crystal melting point, the fusion of the resin occurs to an extent such that stretching becomes impossible.

The stretching magnitude depends on the thickness of the gel-like sheet, but is at least 2 times, preferably at least 5 times, in a uniaxial direction and at least 10 times, preferably at least 25 times, in an area magnitude. At a magnitude of the stretching of less than 10 times of the area, a membrane of a high strength and a high porosity cannot be obtained. Note, it is possible to improve the thermal stability and the mechanical strength of the membrane by heat treatment after stretching.

By controlling the above-described condition for producing a porous polyolefin membrane, the resultant porous polyolefin membrane may be formed to have a thickness of not more than 50 $\mu$m, a porosity of not less than 40%, a tensile strength of not less than 200 kg/cm$^2$, and an average diameter of permeable pores measured by the particle permeation method of 0.001 $\mu$m to 0.1 $\mu$m.

An alkali metal salt and polyethylene glycol can be immobilized in the pores of a porous polyolefin membrane by first preparing a uniform solution of the alkali metal salt and polyethylene glycol and then conducting impregnation, coating or spraying. The uniform solution is obtained by dissolving and mixing an alkali metal salt and polyethylene glycol in a solvent such as nitromethane, methanol, water, acetonitride, acetone, chloroform, methylethylketon or by dissolving an alkali metal salt directly into a solution of a low molecular weight polyethylene glycol. In the impregnation, the porous polyolefin membrane is impregnated in the above solution, the remaining air in the pores of the porous membrane is replaced with the solution by supersonic cavitation or vacuum degassing, excess solvent is removed from the membrane, and then the solvent is removed by air drying or heating, if necessary. In coating or spraying, a porous membrane is placed on a filtering cloth, filtering paper or other filter, the solution is coated or sprayed thereon, and the solvent is removed, if necessary by evacuation, air drying or heating.

A first embodiment of an immobilized electrolyte membrane according to the present invention comprises a polymer electrolyte filled in pores of a porous solid polymer membrane having a thickness of 0.1 $\mu$m to 50 $\mu$m, preferably 2 $\mu$m to 25 $\mu$m, a porosity of 40% to 90%, preferably 60% to 90%, an average permeating pore diameter of 0.001 $\mu$m to 0.1 $\mu$m, preferably 0.005 $\mu$m to 0.05 $\mu$m, and a tensile strength of not less than 200 kg/cm$^2$, preferably not less than 500 kg/cm$^2$, and is characterized in that the membrane has an effective electric resistance at room temperature of 0.05 $\Omega\cdot$cm$^2$ to 500 $\Omega\cdot$cm$^2$, preferably 0.05 $\Omega\cdot$cm$^2$ to 100 $\Omega\cdot$cm$^2$, and is substantially solid and flexible.

A second embodiment of an immobilized electrolyte membrane according to the present invention, comprises an ion-exchange resin filled in pores of a porous solid polymer membrane having the same characteristics as above, and is characterized in that the membrane has an effective electric resistance at room temperature of 1 $\Omega\cdot$cm$^2$ to 10$^{-3}$ $\Omega\cdot$cm$^2$, preferably 0.8 $\Omega\cdot$cm$^2$ to 10$^{-3}$ $\Omega\cdot$cm$^2$, and is substantially solid and flexible.

Furthermore, a remarkable characteristic feature of the present invention is that an electrolyte to be immobilized in pores of a porous solid polymer membrane may be not only a solid but also liquid. For example, polyethylene glycols having a molecular weight of less than about 600 or a complex thereof with an alkali metal salt or a protonic acid is liquid at room temperature. Many polyethylene oxides and polypropylene oxides having a structure of momool, diol or polyol, and copolymers thereof, stay in the form of liquid. These liquid polyethers, liquid polymers such as polyesters and polyimines, and complexes thereof with an alkali metal salt or a protonic acid can be immobilized in pores of a porous solid polymer membrane by capillary condensation, as described-above, to form a substantially solid immobilized electrolyte membrane. To prepare an immobilized liquid electrolyte membrane, the surface tension of the liquid and the contact angle between the liquid and a porous solid polymer membrane are critical. Namely, the surface tension of a liquid at 20° C. is preferably not more than 70 dyne·cm$^{-1}$, more preferably not more than 50 dyne·cm¹, and a contact angle at 20° C. is preferably not more than 90°, more preferably not more than 70°.

The electrolytic membrane according to the present invention can be used in, for example, a primary battery, a secondary battery, an electrochromic device, a high efficient capacitor, a sensor, a concentration and desalting of a water, brine electrolysis by an ionexchange method, water hydrolysis, a fuel cell, donnan dialysis, a concentration of hydrogen, and a memory device, etc. In these electrochemical processes, electrical energy consumed or power generating energy is substantially related to the ohmic loss due to electric resistance, and therefore, an electrolyte membrane having a lower electric resistance is desired. The electric resistance $R(\Omega)$ of a membrane is represented by the formula $$R = K \cdot l/A$$

where l stands for a thickness of the membrane (cm), A stands for a sectional area (CM$^2$), and K is a proportional constant that is an electric resistance of a cube having a unit length (cm) of each side, and is referred to as specific resistance ($\Omega \cdot$cm). As a practical characteristic value, an effective resistance $R'$ ($\Omega \cdot$cm$^2$) is used, that is a resistance for a unit area of a membrane.

$$R' = A \cdot R = K \cdot l$$

The effective electric resistance of an electrical conductive membrane is determined by the specific electric resistance and the membrane thickness, as shown in the above formula, but also depends on the temperature or contaminants. From the practical viewpoint, the value of $R'$ at room temperature must be low, and preferably an immobilized electrolyte membrane of a polymer electrolyte has an effective electric resistance of less than 1000 $\Omega \cdot$cm$^2$, for example, even if formed as a large area membrane. Also, preferably an immobilized electrolyte membrane of an ion-exchange resin has an effective electric resistance of not more than 1 $\Omega \cdot$cm$^2$, more preferably not more than 0.8 $\Omega \cdot$cm$^2$.

Furthermore, an immobilized electrolyte membrane of the present invention comprises a matrix of a biaxially stretched polymer membrane with a stretching area, magnitude of at least 10 times, preferably at least 25 times, and thus has as excellent size stability and uniformity of the membrane thickness, allowing the construction of a cell having excellent electrical characteristics in the area direction thereof and easily allowing a larger area cell or a spiral module or lamination of plane membranes or plates.

Note that in pores of a porous solid polymer membrane used in the present invention, other liquid material, for example, a liquid crystal can be immobilized to form a microdevice having a unique function.

EXAMPLES

The present invention will be further described by way of Examples.

In these Examples, the evaluation of a membrane was carried out by the following methods.

(1) Film thickness: observation of a cross section of a membrane by scanning electron microscopy.

(2) Tensile strength: ASTM D882

(3) Average permeating pore diameter: particle permeation method.

(4) Porosity: Mercury porosimetery.

(5) Electric resistance of membrane: The effective electric resistance was calculated from the membrane thickness and a specific electric resistance obtained from complex impedance plots, which were determined at 25° C. in an argon atmosphere with lithium and platinum electrodes.

(6) Surface tension: the Wilhelmy method.

(7) Contact angle: liquid drop method.

EXAMPLES 1-7

First, 0.125 part by weight of 6-di-t-butyl-p-cresol and 0.25 part by weight of tetrakis[methylene-3-(3,5-di-t-butyl-4-hydroxyphenyl)-propionate]methane as an antioxidant were added to and mixed with 100 parts by weight of a mixture of fluid paraffin (64 cSt/40° C.) containing 4.0% by weight of polyethylene having a weight average molecular weight (Mw) of $2 \times 10^6$. This liquid mixture was charged in an autoclave having a stirrer, and heated to 200° C. for 90 minutes while stirring to obtain a uniform solution.

The obtained solution was charged in a mold and rapidly cooled to 50° C. to produce a gel-like sheet, which was immersed in methylene chloride for 60 minutes, and then applied onto a smooth plate and evaporation dried, to remove the methylene chloride from the sheet. Sevel gel-like sheets having different contents fluid paraffin were thus obtained.

The resultant gel-like sheets were simultaneously biaxially stretched at 115° C. to 130° C., and the stretched membranes washed with methylene chloride to remove the remaining fluid paraffin by extraction, followed by drying, to obtain porous membranes.

The resultant porous solid polymer membranes were immersed in a solution of 15 mole% lithium perchlorate in polyethylene glycol 300, followed by vacuum degassing, to produce electrolytic membranes. The thus-obtained porous polyethylene membranes, and electrolytic membranes were then examined, and the results were as shown in Table 1.

TABLE 1

| Example | Thickness of porous membrane (μm) | Porosity of porous membrane (%) | Tensile strength of porous membrane (kg/cm²) | Average permeating pore diameter of porous membrane $d_{50}$ (μm) | Maximum pore diameter of porous membrane | | Effective resistance of electrolyte membrane (ohm · cm²) |
|---|---|---|---|---|---|---|---|
| | | | | | $d_0$ (μm) | $d_0/d_{50}$ | |
| 1 | 0.6 | 52.8 | 312 | 0.038 | 0.043 | 1.13 | 25 |
| 2 | 0.7 | 68.0 | 1060 | 0.010 | 0.017 | 1.18 | 18 |
| 3 | 1.6 | 81.2 | 2030 | 0.009 | 0.011 | 1.21 | 36 |
| 4 | 4.0 | 40.4 | 501 | 0.085 | 0.095 | 1.12 | 220 |
| 5 | 12 | 80.5 | 2830 | 0.025 | 0.028 | 1.22 | 250 |
| 6 | 22 | 63.0 | 1390 | 0.030 | 0.035 | 1.16 | 600 |
| 7 | 38 | 75.0 | 1700 | 0.020 | 0.023 | 1.15 | 960 |

EXAMPLE 8-12

Porous polyethylene membranes obtained in Examples 2, 4, 5, 6, and 7 were used in Examples 8, 9, 10, 11, and 12, respectively.

The obtained porous membranes were immersed in a commercially available Nafion ® solution (Aldrich reagent, 5 wt % aqueous alcohol solution) and treated by a supersonic cleaner for 20 minutes, followed by removing excess solution and vacuum degassing to remove any remaining solvent by evaporation.

The thus obtained immobilized electrolyte membranes were examined, and the results were as shown in Table 2.

EXAMPLE 13 (COMPARATIVE)

Nafion ® 117 (equivalent weight of 1100) was treated in a solvent containing equal equivalent weights of ethanol and water, by a supersonic cleaner for 20 minutes, followed by measuring the effective electric resistance of the treated Nafion ®.

The results are shown in Table 2.

TABLE 2

| Example | Porosity of porous membrane (%) | Average permeable pore diameter of porous membrane ($\mu$m) | Tensile strength of porous membrane (kg/cm$^2$) | Thickness of porous membrane ($\mu$m) | Effective resistance of electrolyte membrane (m$\Omega \cdot$ cm$^2$) |
|---|---|---|---|---|---|
| 8 | 68.0 | 0.010 | 1060 | 0.7 | 19 |
| 9 | 40.4 | 0.085 | 501 | 4.0 | 140 |
| 10 | 80.5 | 0.025 | 2830 | 12 | 130 |
| 11 | 63.0 | 0.030 | 1390 | 22 | 350 |
| 12 | 75.0 | 0.020 | 1700 | 38 | 790 |
| 13* | | | | | 1600 |

*Comparative Example

EXAMPLE 14-17

Porous polyethylene membranes were prepared in the same manner as described in Examples 1-7, and immersed in a mixed solution of poly(oxyethylene, oxypropylene)glycol monoether having weight average molecular weight of about 240 (Example 14) and about 540 (Example 15), polypropylene glycol monoether having a weight average molecular weight of about 340 (Example 16) and polyethylene glycol having a weight average molecular weight of about 400 (Example 17), with lithium perchlorate, followed by degassing under vacuum.

The thus-obtained membranes were set on a cell, to measure the gas permeability, and oxygen and nitrogen gases were applied to the primary side of the cell at a gauge pressure of 10 kg/cm$^2$, to determine an amount of the gas permeating through the membranes. These tests confirmed that the solution was stably immobilized in pores of the porous polyethylene membranes under pressure and vacuum.

Table 3 shows, in addition to the properties of the membranes, lithium perchlorate concentrations, surface tensions, contact angles with the porous polyethylene membrane of the mixed solutions used in the immersion, ratio of permeation rates of oxygen and nitrogen gases, and effective electric resistances measured by a complex impedance determination.

TABLE 3

| Example | Membrane thickness ($\mu$m) | Porosity (%) | Tensile strength (kg/cm$^3$) | Diameter of permeable pore $d_{50}$ ($\mu$m) | Maximum pore diameter $d_0$ ($\mu$m) | $d_0/d_{50}$ | Concentration of LiClO$_4$ (mol %) | Surface tension (dyne cm$^{-1}$) | Contact angle (°) | Ratio of permeation rates of O$_2$/N$_2$ | Effective resistance ($\Omega \cdot$ cm$^2$) |
|---|---|---|---|---|---|---|---|---|---|---|---|
| 14 | 10 | 80.0 | 1300 | 0.020 | 0.024 | 1.20 | 13.3 | 32.1 | 16.3 | 2.4 | 83 |
| 15 | 10 | 80.0 | 1300 | 0.020 | 0.024 | 1.20 | 38.0 | 34.6 | 30.7 | 2.8 | 40 |
| 16 | 10 | 80.0 | 1300 | 0.020 | 0.024 | 1.20 | 19.4 | 30.1 | 18.2 | 2.2 | 830 |
| 17 | 2.0 | 75.0 | 2500 | 0.020 | 0.023 | 1.15 | 29.7 | 46.5 | 62.3 | 2.2 | 25 |

EXAMPLES 18-19 (COMPARATIVE)

The same porous polyethylene membranes as prepared in Examples 14-16 were immersed in water (Example 18) and propylene carbonate (Example 19), followed by degassing under vacuum. Water or propylene carbonate was not immobilized in pores of the porous polyethylene membranes.

EXAMPLES 20-21 (COMPARATIVE)

A porous polypropylene membrane having a thickness of 25 $\mu$m, a porosity of 38%, and a maximum pore size of 0.2×0.02 $\mu$m (sold under the tradename Celguard 2400 by Cellanese Co.; Example 20) and a similar membrane which was plasma treated for 60 second at a power of 0.3 kW under an air flow of 1.0 Torr (Example 21), an average permeable pore diameter of these membranes being 0.12 $\mu$m, were immersed in a 22.4 mol% solution of lithium thiocyanate in polyethylene glycol 400, followed by degassing under vacuum. The solution was not immobilized in either of the membranes.

We claim:

1. An electrolyte membrane comprising an ionic conductor immobilized in pores of a porous solid polymer membrane, the porous solid polymer membrane having a thickness of 0.1 $\mu$m to 50 $\mu$m, a porosity of 40% to 90%, a tensile strength of not less than 200 kg/cm$^2$, and an average diameter of permeable pores of 0.001 $\mu$m to 0.1 $\mu$m.

2. A membrane according to claim 1, wherein the porous solid polymer membrane has a thickness of 0.1 $\mu$m to 25 $\mu$m, a porosity of 60% to 90%, a tensile strength of not less than 500 kg/cm$^2$, and an average diameter of permeable pores of 0.005 $\mu$m to 0.05 $\mu$m.

3. A membrane according to claim 1, wherein the porous solid polymer membrane is made of a polyolefin having a weight average molecular weight of not less than $5 \times 10^5$.

4. A membrane according to claim 1, wherein the ionic conductor is a complex of a polymer selected from the group consisting of polyetheylene glycol, polyethylene oxide and a polymer containing at least one thereof as a segment, with an alkali metal or alkali earth metal salt or a protonic acid.

5. A membrane according to claim 1, wherein the ionic conductor is a complex of a polymer selected from the group consisting of polypropylene glycol, polypropylene oxide and a polymer containing at least one thereof as a segment, with an alkali metal or alkali earth metal salt or a protonic acid.

6. A membrane according to claim 1, wherein the ionic conductor is a complex of a polymer selected from the group consisting of poly(oxyethylene.oxypropylene)glycol, poly(oxyethylene.oxypropylene)glycol monoether and poly(oxyethylene.oxypropylene)glycol diether, with an alkali metal salt or a protonic acid.

7. An electrolyte membrane comprising a liquid ionic conductor capillary-condensed and immobilized in pores of a porous solid polymer membrane, the porous solid polymer membrane having a thickness of 0.1 $\mu$m to 50 $\mu$m, a porosity of 40% to 90%, a tensile strength of not less than 200 kg/cm$^2$ and an average diameter of permeable pores of 0.001 $\mu$m to 0.1 $\mu$m.

8. A membrane according to claim 7, wherein the porous solid polymer membrane has a thickness of 0.1 $\mu$m to 25 $\mu$m, a porosity of 60% to 90%, a tensile strength of not less than 500 kgcm$^2$ and an average diameter of permeable pores of 0.005 $\mu$m to 0.05 $\mu$m.

9. A membrane according to claim 7, wherein the liquid ionic conductor is a complex of a liquid ether having a surface tension at 20° C. of not more than 70 dyne·cm$^1$ and a contact angle with the porous solid polymer membrane of not more than 90°, with an alkali metal or alkali earth metal salt or a protonic acid.

10. A membrane according to claim 9, wherein the liquid ionic conductor is a complex of a liquid ether having a surface tension at 20° C. of not more than 50 dyne·cm$^{-1}$ and a contact angle with the porous solid polymer membrane of not more than 70°, with an alkali metal or alkali earth metal salt or a protonic acid.

11. A membrane according to claim 7, wherein the porous solid polymer membrane is made of a polyolefin having a weight average molecular weight of not less than $5 \times 10^5$.

12. A membrane according to claim 7, wherein the membrane has an effective electric resistance at room temperature of not more than 1000 $\Omega$·cm$^2$.

13. A membrane according to claim 12, wherein the effective electric resistance is not more than 500 $\Omega$·cm$^2$.

14. An electrolyte membrane comprising an ion-exchange resin immobilized in pores of a porous solid polymer membrane, the porous solid polymer membrane having a thickness of 0.1 $\mu$m to 50 $\mu$m, a porosity of 40% to 90%, a tensile strength of not less than 200 kg/cm$^2$ and an average diameter of permeable pores of 0.001 $\mu$m to 0.1 $\mu$m.

15. A membrane according to claim 14, wherein the porous solid polymer membrane having a thickness of 0.1 $\mu$m to 25 $\mu$m, a porosity of 60% to 90%, a tensile strength of not less than 500 kg/cm$^2$ and an average diameter of permeable pores of 0.005 $\mu$m to 0.05 $\mu$m.

16. A membrane according to claim 14, wherein the porous solid polymer membrane is made of a polyolefin having a weight average molecular weight of not less than $5 \times 10^5$.

17. A membrane according to claim 14, wherein the ion-exchange resin is selected from the group consisting of cationic and anionic ion-exchange resins of hydrocarbon structure.

18. A membrane according to claim 14, wherein the ion-exchange resin is selected from the group consisting of cationic and anionic ion-exchange resins of fluorocarbon structure.

19. A membrane according to claim 14, wherein the membrane has an effective electric resistance of not more than 1 $\Omega$·cm$^2$.

* * * * *